(12) United States Patent
Chainani et al.

(10) Patent No.: US 12,360,818 B1
(45) Date of Patent: Jul. 15, 2025

(54) SYSTEM AND METHOD FOR MULTI-VENDOR ARTIFICIAL INTELLIGENCE WORKLOAD OPTIMIZATION AND RESOURCE ALLOCATION IN CLOUD ENVIRONMENTS

(71) Applicant: HybridAI Pte Ltd., Singapore (SG)

(72) Inventors: Rajesh Chainani, Singapore (SG); Simon Rizkallah, Singapore (SG); Ramesh R, Singapore (SG)

(73) Assignee: HybridAI Pte Ltd., Singapore (SG)

( * ) Notice: Subject to any disclaimer, the term of this patent is extended or adjusted under 35 U.S.C. 154(b) by 0 days.

(21) Appl. No.: 18/804,529

(22) Filed: Aug. 14, 2024

(51) Int. Cl.
*G06F 9/50* (2006.01)
(52) U.S. Cl.
CPC .......... *G06F 9/5044* (2013.01); *G06F 9/505* (2013.01); *G06F 2209/501* (2013.01); *G06F 2209/5019* (2013.01)
(58) Field of Classification Search
None
See application file for complete search history.

(56) References Cited

U.S. PATENT DOCUMENTS

| | | | |
|---|---|---|---|
| 11,750,473 B2* | 9/2023 | Prasanna Kumar | ........................ H04L 41/5009 709/224 |
| 12,135,629 B2* | 11/2024 | Patel | ..................... G06F 9/5044 |
| 2023/0222000 A1* | 7/2023 | Li | ......................... G06F 9/5011 718/102 |

* cited by examiner

*Primary Examiner* — Eric C Wai
(74) *Attorney, Agent, or Firm* — Ziegler IP Law Group

(57) ABSTRACT

A system for recommending and optimizing artificial intelligence (AI) workload placement in a multi-vendor cloud environment is disclosed. The system utilizes a server with at least one processor to access input datasets stored in a datacentre associated with an AI workload and determine suitable processing units from various manufacturers based on predefined criteria. It calculates the required number of processing units and accesses a multi-vendor performance database. A deep learning model predicts infrastructure requirements for the AI workload, enabling the generation of recommendations for optimal processing unit configuration. The system automatically allocates processing unit resources from multiple manufacturers based on these recommendations. Finally, it generates data for a user interface dashboard, presenting information about manufacturers, processing unit types, recommended configurations, and real-time performance metrics of allocated resources. This system optimizes AI workload placement across diverse cloud environments and hardware options.

20 Claims, 3 Drawing Sheets

SYSTEM AND METHOD FOR MULTI-VENDOR ARTIFICIAL INTELLIGENCE WORKLOAD OPTIMIZATION AND RESOURCE ALLOCATION IN CLOUD ENVIRONMENTS

FIELD OF TECHNOLOGY

The present disclosure relates to the field of cloud computing and AI infrastructure management. Moreover, the present disclosure relates to a system and a method for recommending and optimizing artificial intelligence (AI) workload placement in a multi-vendor cloud environment.

BACKGROUND

In today's technologically advanced landscape, enterprises are increasingly relying on cloud computing and AI infrastructure to drive innovation and efficiency. The management of AI workloads across diverse cloud environments has become a critical aspect of maintaining competitive advantage. Efficiently placing AI workloads and selecting the appropriate processing units (xPUs) such as Central Processing Unit (CPUs), Graphics Processing Unit (GPUs), Tensor Processing Unit (TPUs), Data Processing Unit (DPUs), and others from various vendors is essential for achieving optimal performance, cost-effectiveness, and sustainability.

Current technologies offer various independent tools for AI workload management, resource allocation, and performance analysis. However, such tools often lack a common tool and a platform for recommendation, visibility and predictability across various virtualization layers and hardware platform, making it difficult for enterprises to manage AI workloads across multi-vendor cloud environments effectively. Existing solutions tend to focus on specific aspects, such as cost optimization or performance benchmarking, without providing a holistic view of the infrastructure. This limitation leads to overinvestment in certain resources, like GPUs, due to a lack of comprehensive visibility and assessment tools that consider multiple factors such as price-performance ratios and energy efficiency.

Therefore, in light of the foregoing discussion, there exists a need to overcome the aforementioned drawbacks.

Further limitations and disadvantages of conventional and traditional approaches will become apparent to one of skill in the art through comparison of such systems with some aspects of the present disclosure, as set forth in the remainder of the present application with reference to the drawings.

BRIEF SUMMARY OF THE DISCLOSURE

The present disclosure provides a system and a method for recommending and optimizing artificial intelligence (AI) workload placement in a multi-vendor cloud environment. The present disclosure seeks to provide a solution to the existing problem of how to efficiently manage and allocate AI workloads across various cloud service providers with different types of processing units (xPUs), such as CPUs, GPUs, TPUs, DPUs, etc. This is done by considering factors like cost, power consumption, and performance metrics. An aim of the present disclosure is to provide a solution that overcomes at least partially the problems encountered in prior art and provides an improved system and method for AI workload placement that ensures optimal resource utilization, enhanced visibility, and seamless automation across multi-vendor environments.

In one aspect, the present disclosure provides a system for recommending and optimizing artificial intelligence (AI) workload placement in a multi-vendor cloud environment, the system comprising:
  a server comprising at least one processor configured to:
    access input datasets stored in a datacentre associated with an AI workload;
    determine one or more type of processing units associated with one or more manufacturers for the input dataset based on a set of predefined criteria;
    determine a count of processing units required for processing the training dataset based on the determined one or more types of processing units;
    access a multi-vendor processing unit performance database storing performance data for the determined one or more types of processing units from the one or more manufacturers;
    utilize a deep learning model to predict infrastructure requirements for the AI workload;
    generate recommendations for an optimal processing unit configuration based on the multi-vendor processing unit performance database and the predicted infrastructure requirements;
    automatically allocate processing unit resources from the one or more manufacturers based on the recommended optimal processing unit configuration; and
    generate data for display on a user interface dashboard presenting information about the one or more manufacturers, the determined one or more types of processing units, the recommended optimal processing unit configuration, and real-time performance metrics of allocated processing unit resources.

By leveraging a multi-vendor approach, the system enables more flexible and efficient utilization of diverse processing units across different manufacturers, avoiding vendor lock-in and optimizing cost-performance ratios. The deep learning model's predictive capabilities allow for proactive infrastructure planning, reducing resource wastage and improving overall system performance. The automatic allocation of processing unit resources based on optimized recommendations streamlines operations, minimizing manual intervention and potential human errors. The real-time performance metrics displayed on the user interface dashboard offer enhanced visibility and control, enabling quick adjustments to changing workload demands. This comprehensive approach results in improved resource utilization, reduced operational costs, and enhanced AI workload performance across various cloud environments. Furthermore, the system's adaptability to different types of AI workloads (training, inference, etc.) makes it a versatile solution for diverse AI applications in cloud computing scenarios.

In another aspect, the present disclosure provides a method for optimizing artificial intelligence (AI) workload placement in a multi-vendor cloud environment, the method comprising:
  accessing, by at least one processor, input dataset stored in a datacentre associated with an AI workload;
  determining, by the at least one processor, one or more type of processing units associated with one or more manufacturers for the training dataset based on a set of predefined criteria;
  determining, by the at least one processor, a count of processing units required for processing the training dataset based on the determined one or more types of processing units;

accessing, by the at least one processor, a multi-vendor processing unit performance database storing performance data for the determined one or more types of processing units from the one or more manufacturers;

utilizing, by the at least one processor, a deep learning model to predict infrastructure requirements for the AI workload;

generating, by the at least one processor, recommendations for an optimal processing unit configuration based on the multi-vendor processing unit performance database and the predicted infrastructure requirements;

automatically allocating, by the at least one processor, processing unit resources from the one or more manufacturers based on the recommended optimal processing unit configuration; and generating, by the at least one processor, data for display on a user interface dashboard presenting information about the one or more manufacturers, the determined one or more types of processing units, the recommended optimal processing unit configuration, and real-time performance metrics of the allocated processing unit resources.

The method achieves all the advantages and technical effects of the system of the present disclosure.

It has to be noted that all devices, elements, circuitry, units and means described in the present application could be implemented in the software or hardware elements or any kind of combination thereof. All steps which are performed by the various entities described in the present application as well as the functionalities described to be performed by the various entities are intended to mean that the respective entity is adapted to or configured to perform the respective steps and functionalities. Even if, in the following description of specific embodiments, a specific functionality or step to be performed by external entities is not reflected in the description of a specific detailed element of that entity which performs that specific step or functionality, it should be clear for a skilled person that these methods and functionalities can be implemented in respective software or hardware elements, or any kind of combination thereof. It will be appreciated that features of the present disclosure are susceptible to being combined in various combinations without departing from the scope of the present disclosure as defined by the appended claims.

Additional aspects, advantages, features, and objects of the present disclosure would be made apparent from the drawings and the detailed description of the illustrative implementations construed in conjunction with the appended claims that follow.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF THE DISCLOSURE

The following detailed description illustrates embodiments of the present disclosure and ways in which they can be implemented. Although some modes of carrying out the present disclosure have been disclosed, those skilled in the art would recognize that other embodiments for carrying out or practicing the present disclosure are also possible.

Figure 1:
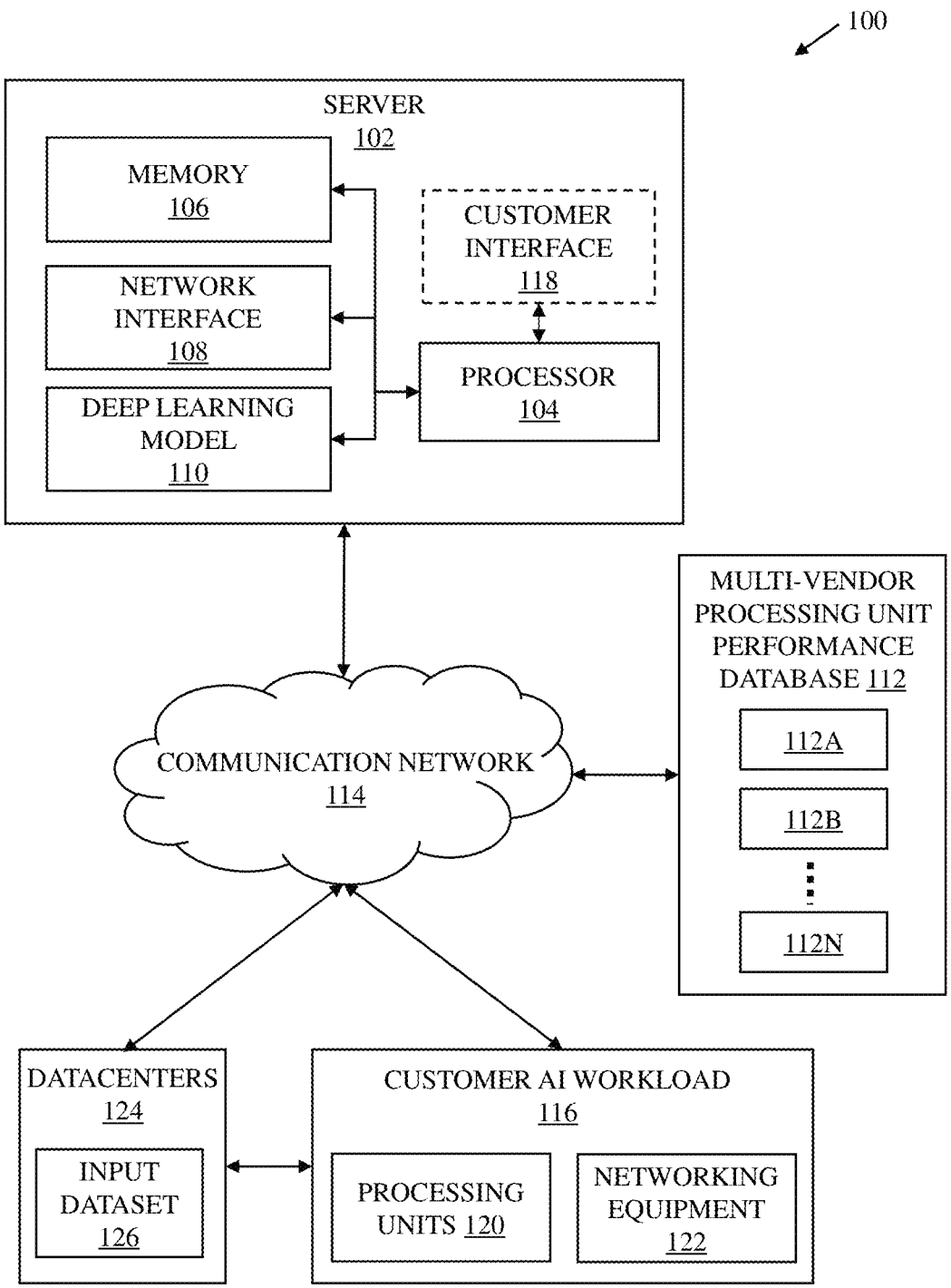
FIG. 1 is a block diagram of a system for recommending and optimizing artificial intelligence (AI) workload placement in a multi-vendor cloud environment, in accordance with an embodiment of the present disclosure.

FIG. 1 is a block diagram of a system for recommending and optimizing artificial intelligence (AI) workload placement in a multi-vendor cloud environment, in accordance with an embodiment of the present disclosure. With reference to FIG. 1, there is shown a block diagram of a system 100. The system 100 includes a server 102. The server 102 includes a processor 104, and a memory 106 communicably coupled to the processor 104. In some implementations, the system 100 may include a plurality of processors (similar to the processor 104) to process various operations dedicatedly. The server 102 further includes a network interface 108, a deep learning model 110, and a customer user interface (UI) 118 communicatively coupled to the processor 104. In some implementations, the server 102 is on-premises in the data center 124, as shown in FIG. 1. However, in some other implementations, the input dataset 126 may be stored in a cloud environment.

The system 100 further includes a multi-vendor processing unit performance database 112 communicably coupled to the server 102 via a communication network 114. The multi-vendor processing unit performance database 112 includes performance data for one or more types of processing units provided by one or more manufacturers. Specifically, the multi-vendor processing unit performance database 112 includes a first performance dataset 112A for each type of processing units provided by a first manufacturer, a second performance dataset 112B for each type processing units provided by a second manufacturer and so on up to a Nth performance data 112N for each type processing units provided by a Nth manufacturer. In some other implementations, the multi-vendor processing unit performance database 112 may also be stored on the same server, such as the server 102. Each performance dataset of the multi-vendor processing unit performance database 112 may be retrieved automatically by the processor 104 via the communication network 114 and stored in the memory 106. The server 102 may be communicably coupled to a plurality of customer AI workloads, such as a customer AI workload 116, via the communication network 114. The customer AI workload 116 includes one or more processing units 120 and one or more networking equipment 122. Moreover, the server 102 may be communicably coupled to a plurality of data centers, such as a datacenter 124. The datacenter 124 is further communicatively coupled to the customer AI workload 116. The datacenter 124 includes an input dataset 126, which may include training data, model parameters, and other relevant datasets associated with the customer AI workload 116. In some implementations, the input dataset 126 is stored on-premises in the data center 124, as shown in FIG. 1. However, in some other implementations, the input dataset 126 may be stored in a cloud environment. In some examples, the input dataset 126 may be stored in a network-attached storage (NAS), storage area networks (SAN), or cloud storage services.

The present disclosure provides the system 100 for recommending and optimizing artificial intelligence (AI) workload placement in a multi-vendor cloud environment, where the system 100 access the input datasets 126 stored in the datacentre 124 associated with AI workloads, determine suitable processing units from various manufacturers based on predefined criteria, and calculate the required number of processing units. The system 100 accesses the multi-vendor performance database 112 and utilizes the deep learning model 110 to predict infrastructure requirements for AI workloads. Based on these predictions and database information, the system 100 generates recommendations for optimal processing unit configurations. The system 100 then automatically allocates processing resources from multiple manufacturers according to the generated recommendations. Finally, the system 100 generates a user interface (UI) dashboard displaying information about various manufacturers, processing unit types, recommended configurations, and real-time performance metrics of allocated resources.

The technical advantages and effects of the system 100 are manifold. By adopting a multi-vendor approach, the system 100 enables more flexible and efficient utilization of diverse processing units, avoiding vendor lock-in and optimizing cost-performance ratios across different manufacturers. Predictive capabilities of the deep learning model 110 allow for proactive infrastructure planning, significantly reducing resource wastage and improving overall system performance. Automatic allocation of processing unit resources based on optimized recommendations streamlines operations, minimizing manual intervention and potential human errors. The real-time performance metrics displayed on the UI dashboard offer enhanced visibility and control, enabling quick adjustments to changing workload demands. This comprehensive approach results in improved resource utilization, reduced operational costs, and enhanced AI workload performance across various cloud environments. Furthermore, adaptability of the system 100 to different types of AI workloads (such as training, inference, and generative AI) makes it a versatile solution for diverse AI applications in cloud computing scenarios, providing a significant technical advancement in the field of AI infrastructure management and optimization. The term "AI workload" refers to a computational tasks and processes associated with training, validating, or deploying artificial intelligence models. The AI workloads may vary significantly based on the type of AI task, such as deep learning, machine learning, or natural language processing.

The server 102 includes suitable logic, circuitry, interfaces, and code that may be configured to communicate with the multi-vendor processing unit performance database 112 and the customer AI workload 116 via the communication network 114. In an implementation, the server 102 may be a master server or a master machine that is a part of a datacenter that controls an array of other cloud servers communicatively coupled to it for load balancing, running customized applications, and efficient data management. Examples of the server 102 may include, but are not limited to a cloud server, an application server, a data server, or an electronic data processing device. In some examples, the server 102 is deployed on-premises, depending on the customer's infrastructure setup. In some other examples, the server 102 is deployed in the cloud environment, depending on the customer's infrastructure setup.

The processor 104 refers to a computational element that is operable to respond to and processes instructions that drive the system 100. The processor 104 may refer to one or more individual processors, processing devices, and various elements associated with a processing device that may be shared by other processing devices. Additionally, the one or more individual processors, processing devices, and elements are arranged in various architectures for responding to and processing the instructions that drive the system 100. In some implementations, the processor 104 may be an independent unit and may be located outside the server 102 of the system 100. Examples of the processor 104 may include but are not limited to, a hardware processor, a digital signal processor (DSP), a microprocessor, a microcontroller, a complex instruction set computing (CISC) processor, an application-specific integrated circuit (ASIC) processor, a reduced instruction set (RISC) processor, a very long instruction word (VLIW) processor, a state machine, a data processing unit, a graphics processing unit (GPU), and other processors or control circuitry.

The memory 106 refers to a volatile or persistent medium, such as an electrical circuit, magnetic disk, virtual memory, or optical disk, in which a computer can store data or software for any duration. Optionally, the memory 106 is a non-volatile mass storage, such as a physical storage media. The memory 106 is configured to store the performance datasets 112A to 112N of the multi-vendor processing unit performance database 112. The memory 106 is further configured to store the input datasets 126 fetched from the datacenter 124. Furthermore, a single memory may encompass and, in a scenario, and the system 100 is distributed, the processor 104, the memory 106 and/or storage capability may be distributed as well. Examples of implementation of the memory 106 may include, but are not limited to, an Electrically Erasable Programmable Read-Only Memory (EEPROM), Dynamic Random-Access Memory (DRAM), Random Access Memory (RAM), Read-Only Memory (ROM), Hard Disk Drive (HDD), Flash memory, a Secure Digital (SD) card, Solid-State Drive (SSD), and/or CPU cache memory.

The network interface 108 refers to a hardware and software components that facilitate communication between a computer or device and a network. The network interface 108 acts as a point of connection for sending and receiving data over the communication network 114. The network interface 108 may include network interface cards (NICs), which are physical hardware installed in a computer, or virtual network interfaces used in virtualized environments. The network interface 108 may manage the physical and logical aspects of network connectivity, handling data transmission, reception, and protocol communication to ensure that devices can communicate effectively within a network.

The deep learning model 110 refers to a sophisticated neural network designed to analyze and interpret large volumes of data from various sources, including data sheets, historical data, and real-time performance data. In some implementations, the deep learning model 110 is trained to predict AI infrastructure requirements by considering factors such as cost, power consumption, and performance metrics. The deep learning model 110 enhances visibility and observability across telemetry, data platforms, and resource consumption, allowing for informed decision-making regarding the optimal placement and allocation of AI workloads in the multi-vendor cloud environment. By leveraging deep learning techniques, the deep learning model 110 may provide accurate and context-aware recommendations, ensuring efficient resource utilization and improved overall system performance.

The multi-vendor processing unit performance database 112 refers to a comprehensive repository that includes performance data for various types of processing units (such as CPUs, GPUs, TPUs, etc.) from multiple manufacturers. The multi-vendor processing unit performance database 112 contains detailed performance datasets for each type of processing unit provided by different manufacturers, such as the first performance dataset 112A for units from the first manufacturer (e.g., NVIDIA), the second performance dataset 112B for units from the second manufacturer (e.g., AMD), and so on up to the Nth performance dataset 112N for units from the Nth manufacturer (e.g., Intel). The multi-vendor processing unit performance database 112 includes relevant data such as computational power, energy consumption, cost metrics, throughput, and latency, along with other performance indicators. The multi-vendor processing unit performance database 112 aggregates standardized information from vendor data sheets, historical performance metrics from previous AI workloads, and real-time performance data collected from the customer's infrastructure. This repository serves as a critical resource, enabling the system to access and analyze diverse performance data to make informed decisions about the optimal allocation and placement of AI workloads across the multi-vendor cloud environment.

The communication network 114 includes a medium (e.g., a communication channel) through which the server 102 communicates with the multi-vendor processing unit performance database 112, the customer AI workload 116, and the datacenter 124. The communication network 114 may be a wired or wireless communication network. Examples of the communication network 114 may include, but are not limited to, Internet, a Local Area Network (LAN), a wireless personal area network (WPAN), a Wireless Local Area Network (WLAN), a wireless wide area network (WWAN), a cloud network, a Long-Term Evolution (LTE) network, a plain old telephone service (POTS), a Metropolitan Area Network (MAN), and/or the Internet.

The customer AI workload 116 refers to a specific AI workload or application that the customer or end-user is trying to deploy and run in the multi-vendor cloud environment. The customer AI workload is computational tasks required to train, test, or run an AI model. Such tasks may be resource-intensive, involving heavy calculations and data processing.

The customer interface 118 refers to a graphic user interface or dashboard on which the customer interacts with the system 100. The customer interface 118 presents information about the AI workload placement, including details about the processing units from various manufacturers, the recommended optimal configurations, real-time performance metrics, and other relevant data. The customer interface 118 allows the customer to interact with the system 100, make adjustments, and access reports generated by the system 100.

The processor units 120 refers to the hardware components responsible for executing the computational tasks. In the customer AI workload 116, the processing units 120 may include, but are not limited to, CPUs, GPUs, TPUs, DPUs, and the like.

The networking equipment 122 may include, but are not limited to, switches and routers to manage data traffic between the processing units 120 and the datacenter 124, network interface cards (NICs) that enable communication between the processing units 120 and other components, and firewalls and load balancers to ensure secure and efficient distribution of data across the infrastructure.

The datacenter 124 refers to facilities used to house computer systems and associated components, such as telecommunications and storage systems. They are crucial for the operation of many modern digital services and applications. The datacenters 124 provide a controlled environment for servers and other critical IT equipment to ensure reliability, security, and efficiency in handling large amounts of data and running applications. The datacenter 124 is configured to store the input dataset 126 associated with the processing units 120 of the customer AI workload 116.

The input datasets 126 associated with the customer AI workload 116 includes, but not limited to, three main sources of information. Firstly, data sheets are reference documents provided by vendors of the processing units 120 such as NVIDIA, AMD, and Intel, containing detailed specifications and performance metrics for the processing units 120 (CPUs, GPUs, TPUs, etc.). The data sheets offer standardized information about the capabilities and characteristics of various hardware options available in the multi-vendor cloud environment. In some examples, the datasheets may be in various formats. Such formats may include, but are not limited to, PDF, CSV, HTML, or API. Further, the datasheets may include, but not limited to, benchmarks such as throughput, batch size, throughput per Watt, batch size per Watt, throughput per Dollar, batch size per Dollar, latency, different levels of floating-point precision (for example FP64, FP32, FP16), LLM models with various parameters, power consumption, and cost. Secondly, historical data includes past performance data and usage patterns from the customer's previous AI workloads. For brownfield deployments, this historical data provides valuable insights into how different types of AI workloads have performed on various hardware configurations over time. Lastly, real-time data is continuously collected from the customer's infrastructure once the system 100 is deployed. This includes current utilization rates, performance metrics, and other relevant telemetry data from servers, GPUs, CPUs, network cards, virtualization layers, storage systems, and networks. In some examples, the input dataset 126 may include, but not limited to, data and performance reports from various vendors, industry standard performance reports, and brownfield data related to performance from existing infrastructure. By leveraging such combination of data sources—data sheets, historical data, and real-time data—the system 100 may make informed decisions based on both theoretical capabilities, past performance, and current operating conditions, thus providing more accurate and context-aware recommendations for optimizing AI workload placement across the multi-vendor cloud environment.

In operation, the processor 104 is configured to access the input datasets 126 stored in the datacenter 124 associated with an AI workload. In some implementations, the system 100 automatically retrieves relevant data stored in the datacenter 124, which may be in various formats. Some examples of such formats may include, but are not limited to, CSV, PDF, or API outputs. The input datasets 126 includes, but not limited to, performance metrics, historical usage patterns, and real-time telemetry from various hardware components like GPUs, CPUs, and storage systems. By accessing this pre-existing data, the processor can efficiently analyze and process the information needed to recommend optimal AI workload placements. This automated data retrieval process not only reduces the need for user intervention but also ensures that the system operates on comprehensive and up-to-date information, leading to more accurate and effective recommendations. In some examples, the processor 104 interfaces with storage systems of the datacenter 124 through secure APIs or direct database connections to fetch and process the necessary datasets. By virtue of accessing the input datasets 126 stored in the datacenter 124, this may enable precise recommendations and optimizations based on extensive and up-to-date data, leading to improved performance and cost-efficiency in managing AI workloads.

The processor 104 is further configured to determine one or more type of processing units associated with one or more manufacturers for the input datasets 124 based on a set of predefined criteria. In some implementations, the set of predefined criteria includes at least one of: cost, price-performance ratio, or power consumption. In some other implementations, the set of predefined criteria may include, but not limited to, processing speed, cost efficiency, utilization efficiency, energy consumption, throughput, latency, scalability, model accuracy, system reliability and downtime, software compatibility and optimization. The process involves executing an analysis to compare the specifications and capabilities of various processing units, such as GPUs, CPUs, or TPUs, with the requirements outlined in the input datasets 126. This analysis is conducted through operations that assess how well each type of processing unit meets the workload demands. By identifying the processing units that best align with the set of predefined criteria, the processor 104 optimizes hardware selection. The technical effect of this configuration is the precise matching of processing units to workload requirements, leading to enhanced performance and efficient resource utilization tailored to the specific needs of the AI application.

In some implementations, the one or more type of processing units includes at least one of: graphics processing units (GPUs), tensor processing units (TPUs), central processing units (CPUs), or intelligence processing units (IPUs). However, in some other implementations, the one or more type of processing units may include any other type of processing unit, as per application requirement.

The processor 104 is further configured to determine a count of processing units required for processing the input datasets 124 based on the determined one or more types of processing units. Determine the count of the processing units involves evaluating the computational needs of the AI workload specified in the input datasets and calculating the number of processing units needed to handle these requirements effectively. The processor 104 is configured to performs such calculation by analyzing the performance metrics of the selected processing units and matching them against the workload demands. The technical effect of this configuration is the precise determination of the optimal number of processing units required, ensuring that the workload is processed efficiently and without underutilization or overprovisioning of resources.

The processor 104 is further configured to access the multi-vendor processing unit performance database 112 storing the performance data 112A to 112N for the determined one or more types of processing units from the one or more manufacturers. This process involves retrieving data on metrics such as throughput, latency, power consumption, and cost associated with each type of processing unit listed in the multi-vendor processing unit performance database 112. The processor 104 is configured to utilize the performance data 112A to 112N to assess and compare the performance characteristics of different hardware options. The technical effect of this configuration is the ability to make informed decisions regarding hardware selection by leveraging comprehensive performance data, leading to optimal configuration and resource utilization based on empirical evidence.

In some implementations, the at least one processor 104 is further configured to update the multi-vendor processing unit performance database 112 with performance data from the allocated processing unit resources. As discussed above, the processor 104 is configured to retrieve data on a certain metrics (such as throughput, latency, power consumption, and cost) associated with each type of processing unit. In some examples based on the above mentioned metrics, the performance data may be outdated, incorrect, or incomplete due to variety of reasons, past errors, or defects. Thus, the processor 104 automatically analyze the performance data of the allocated processing unit resources. Then, the processor 104 is configured to find any discrepancies in the performance data stored in the multi-vendor processing unit performance database 112 by comparing the analyzed performance data of the allocated processing unit resources with the performance data stored in the multi-vendor processing unit performance database 112. Lastly, the processor 104 updates the multi-vendor processing unit performance database 112 with updated performance data from the allocated processing unit resources, if the performance data is not in a predefined threshold range.

The processor 104 is further configured to utilize the deep learning model 110 to predict infrastructure requirements for the AI workload. In some implementations, in order to utilize the deep learning model 110 to predict the infrastructure requirements, the at least one processor 104 is further configured to improve visibility into current telemetry data, data platform metrics, and resource consumption. This enhanced visibility allows the deep learning model 110 to make more informed predictions based on real-time and historical data. The system 100 collects and analyses a wide range of parameters to gain comprehensive insights into the infrastructure's performance and utilization.

For the server platform, the system 100 monitors network interface card (NIC) settings (RDMA/SR-IOV) and status, as well as AI/GPU-specific parameters. In an open-source container orchestration environment, the system 100 tracks node usage (including CPU, memory, GPU, storage, power, network, and NIC type), node status, pod usage, storage utilization, and various components like pods, services, deployments, controllers, and daemonsets. The system 100 also integrates with the open-source container orchestration environment for logs and alerts, monitors node-to-pod locations, and analyses resource utilization patterns.

In case of a centralized management utility for virtual machines (VM), the system 100 observes ESXi status and usage, VM utilization, storage utilization, hardware health as reported by sensors of the centralized management utility, and latency. These diverse data points provide a holistic view of the infrastructure's performance across different layers and technologies.

By incorporating these detailed metrics into its analysis, the deep learning model 110 may make highly accurate predictions about the infrastructure requirements for specific AI workloads. This predictive capability enables the system to generate optimal processing unit configurations, taking into account factors such as performance, cost-effectiveness, and power efficiency across multiple vendors.

In some implementations, the deep learning model 104 is configured to dynamically adjust its predictions based on real-time performance metrics of the allocated processing unit resources. In such implementations, the improved visibility also allows for dynamic adjustments to resource allocation based on real-time performance data. This adaptability ensures that AI workloads receive the necessary resources while maintaining overall system efficiency. Furthermore, the comprehensive data collection supports advanced features like load balancing, cost optimization through dynamic reallocation, and the generation of detailed performance reports and alerts.

Ultimately, this deep learning-driven approach to infrastructure prediction and optimization enables organizations to maximize the utilization of their multi-vendor cloud resources, reduce costs, and ensure optimal performance for their AI workloads in complex, heterogeneous computing environments.

In some implementations, the deep learning model 110 is trained on historical resource usage, performance, and cost data. In such implementations, training the deep learning model 110 on the historical resource usage patterns encompasses CPU, memory, GPU, and storage utilization across various AI workloads over time. By analyzing these patterns, the deep learning model 110 learns to identify trends and correlations between workload characteristics and resource demands. Further, by training the deep learning model 110 on performance metrics, the deep learning model 110 incorporates data on execution times, throughput, and latency for different types of AI tasks on various processing units. This information helps the model understand the performance capabilities of different hardware configurations. By training the deep learning model 110 on the cost data, historical pricing information for different processing units and cloud services is included to enable cost-effective recommendations. This allows the deep learning model 110 to balance performance requirements with budgetary constraints.

In some other implementations, the deep learning model 110 may be trained on a comprehensive dataset that includes, but not limited to workload characteristics, multi-vendor hardware specifications, energy consumption data, scaling behaviour, failure and maintenance records, network utilization and data transfer patterns, and seasonal and temporal variations.

In some examples, the deep learning model 110 is trained on data describing the nature of different AI workloads, such as model architecture, dataset size, and computational complexity. This helps in predicting resource requirements for specific types of AI tasks. In another example, detailed information about the capabilities and limitations of processing units from various manufacturers is incorporated into the training data. This enables the model to make informed decisions when recommending optimal configurations across different vendors. In yet another example, historical data on power usage for different hardware configurations is included to optimize for energy efficiency, an increasingly important factor in data center operations. In yet another example, the deep learning model 110 learns how resource requirements change as workloads scale up or down, enabling accurate predictions for various sizes of AI projects. In some other examples, By incorporating data on hardware failures and maintenance schedules, the deep learning model 110 may factor in reliability and availability when making recommendations. In other examples, network utilization and data transfer patterns helps the deep learning model 110 optimize for scenarios where data movement between nodes or clusters is a significant factor. In some other examples, the deep learning model 110 learns to account for time-based patterns in resource demand, such as peak usage periods or cyclical workloads.

In some implementations, by training on a diverse and comprehensive dataset, the deep learning model 110 develops the capability to make nuanced, context-aware predictions. The deep learning model 110 may identify complex relationships between various factors affecting infrastructure requirements, enabling it to generate highly optimized recommendations for AI workload placement and resource allocation.

In some implementations, the training process of the deep learning model 110 involves techniques such as supervised learning on labelled historical data, as well as potentially incorporating reinforcement learning elements to optimize decision-making over time. Regular retraining with new data ensures that the deep learning model 110 stays up-to-date with the latest hardware developments and evolving workload patterns.

This data-driven approach allows the system 100 to continually improve its predictive accuracy and adapt to changing conditions in the multi-vendor cloud environment. As a result, organizations can achieve more efficient resource utilization, reduced costs, and improved performance for their AI workloads across diverse and complex computing infrastructures.

The processor 104 is further configured to generate recommendations for an optimal processing unit configuration based on the multi-vendor processing unit performance database 112 and the predicted infrastructure requirements. Generating the recommendations for the optimal processing unit configuration ensures that AI workloads are allocated the most suitable resources across different manufacturers, optimizing performance and cost-efficiency. The processor 104 analyses the performance characteristics of various processing units in conjunction with the specific needs of the AI workload to determine the ideal configuration.

The processor 104 is further configured to automatically allocate processing unit resources from the one or more manufacturers based on the recommended optimal processing unit configuration. This automation streamlines the resource provisioning process, reducing manual intervention and potential human errors. The automatic allocation of the processing unit resources allows for rapid deployment of AI workloads across a heterogeneous computing environment, maximizing the utilization of available resources from different vendors. In some implementations, the at least one processor 104 is further configured to perform load balancing across the allocated processing unit resources from the one or more manufacturers. Performing load balancing across the allocated processing unit resources ensures that workloads are distributed evenly, preventing bottlenecks and optimizing overall system performance. The load balancing mechanism adapts to real-time conditions, redistributing tasks as necessary to maintain optimal utilization of all available resources. Specifically, to achieve this, the system 100 uses real-time performance metrics collected from the allocated processing units. The real-time performance metrics, combined with the performance data stored in the multi-vendor processing unit performance database 112, allow the system 100 to make informed decisions about how to distribute the workload. The load balancing operation may consider factors such as processing speed, memory capacity, energy efficiency, and current utilization of each unit when deciding how to allocate tasks.

Performing the load balancing across the allocated processing unit resources complements the system's 100 other capabilities, such as dynamically adjusting resource allocation based on real-time performance and pricing information. Together, these features create a highly adaptable and efficient system for managing AI workloads across diverse hardware resources in a multi-vendor cloud environment.

In some implementations, the at least one processor 104 is further configured to optimize resources cost by dynamically reallocating processing unit resources based on real-time pricing information from the one or more manufacturers. Cost optimization is achieved through dynamic reallocation of the processing unit resources based on real-time pricing information from multiple manufacturers. This functionality allows the system 100 to take advantage of fluctuations in resource costs, shifting workloads to more cost-effective options as they become available. This dynamic approach to resource allocation helps organizations minimize expenses while maintaining performance standards.

The processor 104 is further configured to generate data for display on the user interface dashboard presenting information about the one or more manufacturers, the determined one or more types of processing units, the recommended optimal processing unit configuration, and real-time performance metrics of allocated processing unit resources. The UI dashboard presents a wide range of information, starting with details about the various hardware manufacturers involved in the customer's AI infrastructure. The UI dashboard may include, but not limited to, names of leading GPU manufacturers, major CPU providers, and prominent cloud service companies. The UI dashboard also displays information about the types of processing units in use, which may encompass GPUs, TPUs, CPUs, or IPUs, along with their specific models and capabilities.

Furthermore, the UI dashboard displays the recommended optimal processing unit configuration. This may be presented as a graphical representation of the suggested hardware layout, including the number and type of each processing unit, their interconnections, and how each processing unit is distributed across different manufacturers or cloud providers. This information helps customers to understand the rationale behind the recommendations of the system 100 and allows them to make informed decisions about their infrastructure.

Real-time performance metrics of the allocated processing unit resources are another crucial component of the UI dashboard. The real-time performance metrics may include, but not limited to GPU utilization rates, memory usage, processing speeds, power consumption, and job completion times. The UI dashboard may present the real-time performance metrics through dynamic charts, graphs, or heat maps, allowing the customers to quickly identify performance bottlenecks or underutilized resources.

Additional examples of information that may be presented on the UI dashboard include, but are not limited to, cost analytics, showing current spending and projections based on resource usage, comparative performance data, illustrating how different processing units or configurations perform for specific AI workloads, energy efficiency metrics, helping the customers understand the environmental impact of their AI operations, workload distribution visualizations, showing how tasks are balanced across different resources, historical performance trends, allowing the customers to track improvements or degradations over time, alerts and notifications for any performance issues or resource constraints, and predictive analytics, suggesting future resource needs based on current usage patterns.

By providing complex information valuable to the customers in a simple format, the UI dashboard empowers customer to make data-driven decisions about their AI infrastructure. The UI dashboard allows for quick identification of issues, validation of the recommendations of the system 100, and provides the transparency needed for the customers to trust and effectively manage their complex, multi-vendor AI environments. This level of visibility and control is essential for optimizing both the performance and cost-effectiveness of AI workloads in today's diverse cloud ecosystems.

In some implementations, the user interface dashboard provides options for manual override of the recommended optimal processing unit configuration. In other words, to accommodate specific customer requirements or unforeseen circumstances, the user interface dashboard includes options for manual override of the recommended optimal processing unit configuration. This feature provides flexibility and allows human operators to intervene when necessary, ensuring that the system 100 can adapt to unique situations or preferences not captured by the automated recommendation process.

In some implementations, the at least one processor 104 is further configured to decide policy criteria for the AI workload and resource access using an AI policy and resource manager. In other words, the processor 104 incorporates an AI policy and resource manager to decide policy criteria for AI workloads and resource access. Deciding the policy criteria ensures that resource allocation and workload management adhere to organizational policies, security requirements, and compliance standards. Also, deciding the policy criteria provides a framework for consistent and controlled access to resources across the multi-vendor environment.

In some implementations, the at least one processor 104 is further configured to generate alerts when the real-time performance metrics deviate from the predicted infrastructure requirements by a predetermined threshold. In other words, to maintain health and performance of the system 100, the processor 104 generates alerts when real-time performance metrics deviate from predicted infrastructure requirements by the predetermined threshold. This proactive monitoring allows for timely intervention in case of unexpected performance issues or resource shortages, helping to maintain the efficiency and reliability of the AI infrastructure.

In some implementations, the at least one processor 104 is further configured to generate a report comparing the predicted infrastructure requirements with actual performance metrics of the allocated processing unit resources. Specifically, for analytical purposes, the processor 104 generates reports comparing predicted infrastructure requirements with the actual performance metrics of allocated processing unit resources. The generated reports provide valuable feedback on the accuracy of the deep learning model 110 and the efficiency of resource allocation, enabling continuous improvement of the system's 100 predictive capabilities and optimization strategies.

In some implementations, the at least one processor 104 is further configured to simulate different processing unit configurations before actual allocation to optimize resource utilization. Simulating the different processing unit configurations allows organizations to test various scenarios and configurations without committing actual resources, reducing the risk of suboptimal deployments and enabling more informed decision-making in resource allocation.

Figure 2:
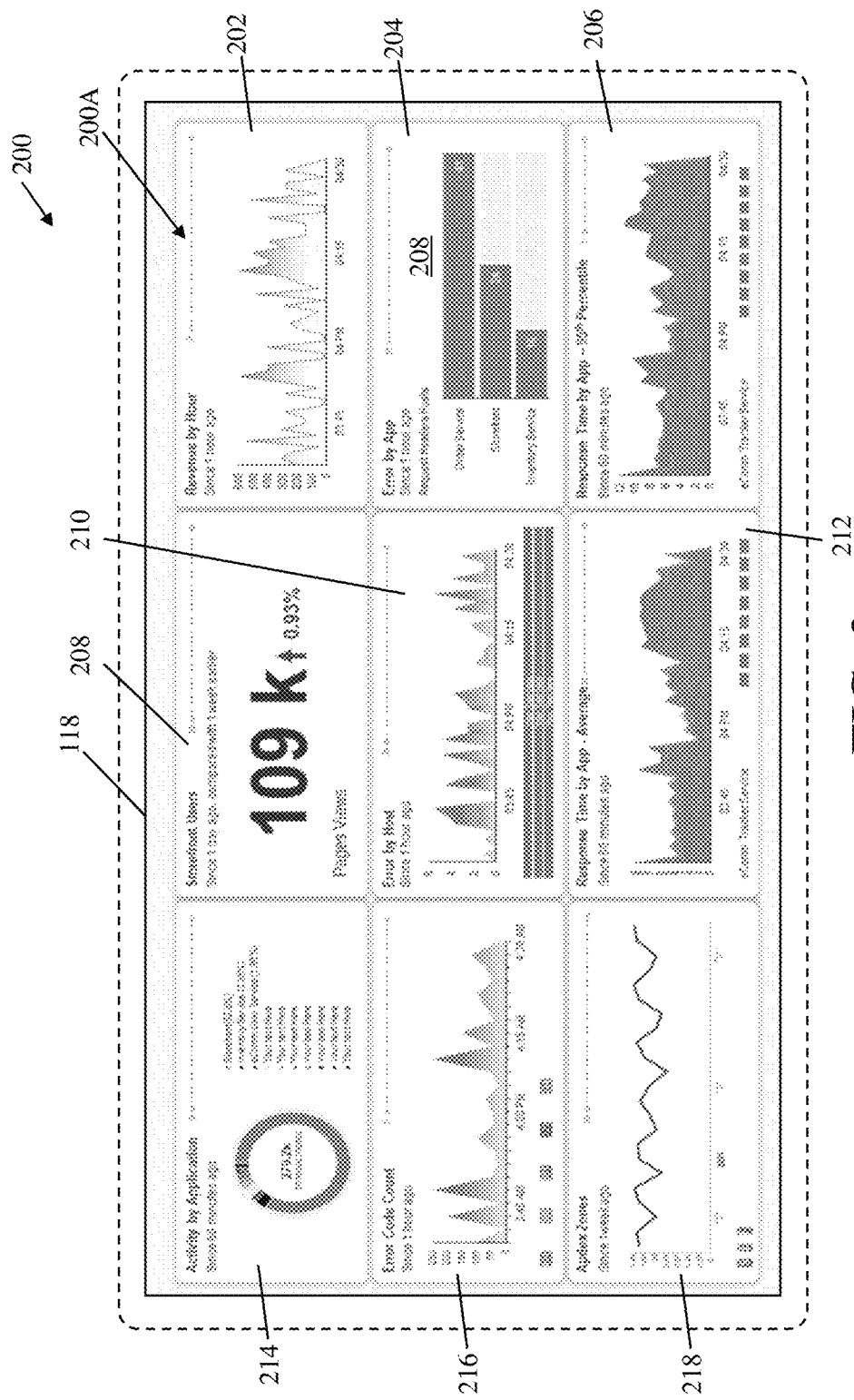
FIG. 2 is a diagram of a customer device displaying a user interface dashboard, in accordance with an embodiment of the present disclosure.

FIG. 2 is a diagram of a customer device displaying a user interface dashboard, in accordance with an embodiment of the present disclosure. FIG. 2 is described in conjunction with elements from FIG. 1. With reference to FIG. 2, there is shown a display device 200 displaying the customer interface 118. The customer UI 118 displays a UI dashboard 200A.

The UI dashboard 200 includes multiple data visualization components that provide real-time performance metrics and analytics for the AI workload optimization system. The data visualization components include a revenue by hour graph 202 displaying hourly revenue trends, an error by app bar chart 204 showing error rates for different applications or services, and a response time by app percentile chart 206 illustrating response time distributions across applications. At the center of the dashboard is a central metric display 208 showing a key performance indicator (109K views in this case) with a percentage change indicator. The UI dashboard 200 also features an error by host graph 210 depicting error rates across different host machines and a response time by app average chart 212 showing average response times for various applications. An activity by application pie chart 214 displays the distribution of activity across different applications, while an error code count graph 216 shows the frequency of various error codes over time. Finally, a line graph 218 illustrates performance zones over time. The x-axis of the graph 218 likely represents a time scale, allowing the customers to view performance trends over hours, days, or even longer periods. The y-axis appears to show the distribution of performance across different zones, which may be categorized based on predefined thresholds or service level agreements (SLAs).

Each of data visualization components 202 to 218 provides specific insights into different aspects of system performance, allowing the customers to monitor, analyze, and optimize AI workload placement and resource allocation in real-time. The UI dashboard 200 is designed to offer a comprehensive overview of system health, performance, and efficiency metrics in an easily digestible visual format, enabling the customers to make informed decisions about resource allocation and workload optimization.

Figure 3:
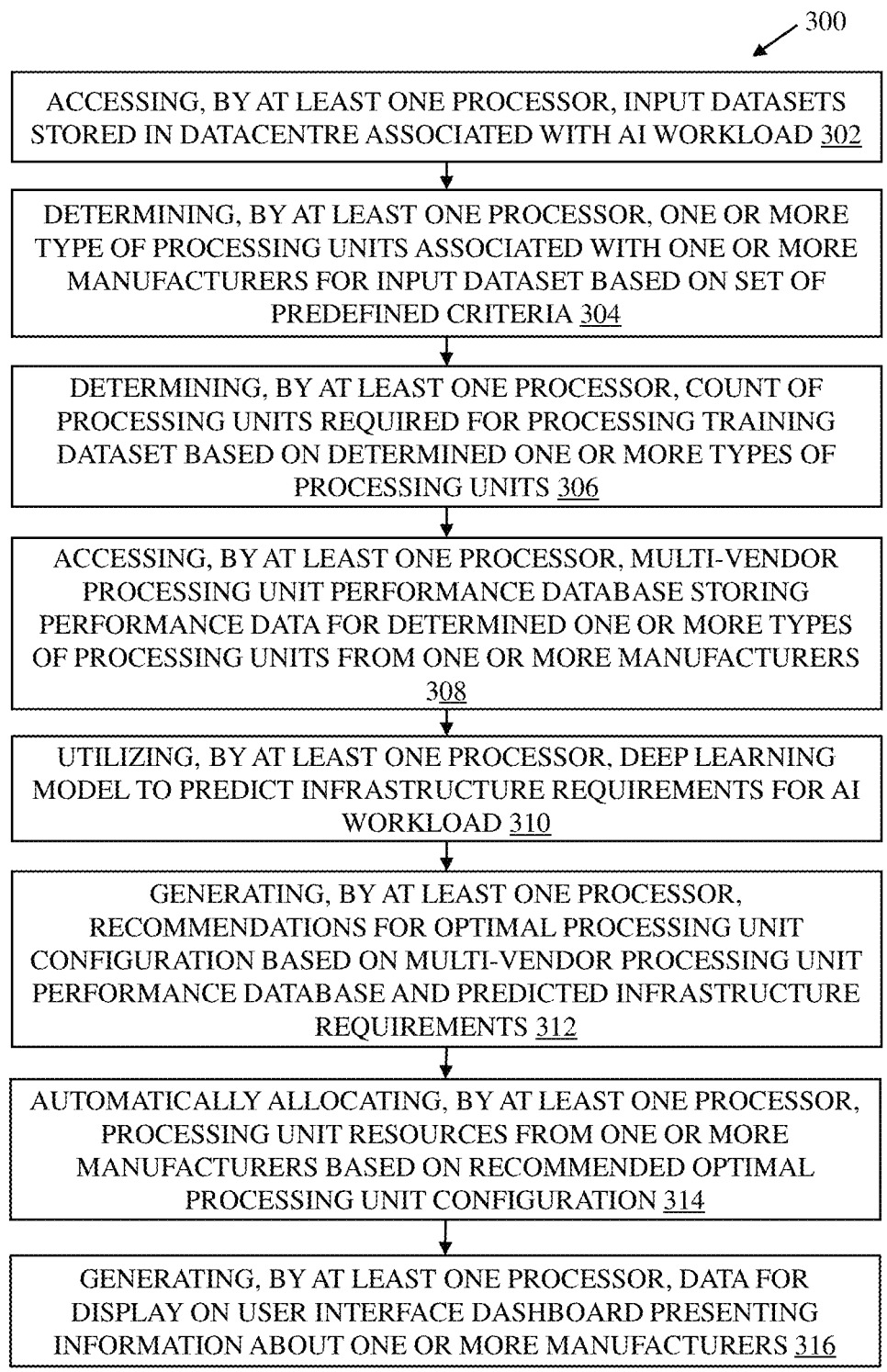
FIG. 3 is a flowchart of a method for recommending and optimizing artificial intelligence (AI) workload placement in a multi-vendor cloud environment, in accordance with an embodiment of the present disclosure.

FIG. 3 is a flowchart of a method for recommending and optimizing artificial intelligence (AI) workload placement in a multi-vendor cloud environment, in accordance with an embodiment of the present disclosure. FIG. 3 is explained in conjunction with elements from FIGS. 1 and 2. With reference FIG. 3, there is shown a flowchart of a method 300. The method 300 is executed at the server 102 (of FIG. 1). The method 300 may include steps 302 to 316.

At step 302, the method 300 includes accessing, by at least one processor 104, the input datasets 126 stored in the datacenter 124 associated with the AI workload (i.e., the customer AI workload 116). This step ensures that the system 100 has access to the necessary data for processing the AI workload. By centralizing data access, this step allows for efficient data management and reduces data transfer overhead, which is crucial for large-scale AI operations.

At step 304, the method 300 further includes determining, by the at least one processor 104, the one or more type of processing units associated with the one or more manufacturers for the input datasets 124 based on the set of predefined criteria. In some embodiments, the set of predefined criteria includes at least one of cost, price-performance ratio, or power consumption. This step enables the processor 104 to match the AI workload requirements with the most suitable types of processing units. By considering factors like cost, price-performance ratio, and power consumption, the processor 104 optimizes resource allocation and potentially reduces operational costs.

In some implementations, the one or more type of processing units includes at least one of: graphics processing units (GPUs), tensor processing units (TPUs), central processing units (CPUs), or intelligence processing units (IPUs).

At step 306, the method 300 further includes determining, by the at least one processor 104, a count of processing units required for processing the input datasets 124 based on the determined one or more types of processing units. This step ensures that the right amount of processing power is allocated to the AI workload, preventing both under-provisioning (which could lead to performance issues) and over-provisioning (which could result in unnecessary costs).

At step 308, the method 300 further includes accessing, by the at least one processor 104, the multi-vendor processing unit performance database 112 storing the performance data for the determined one or more types of processing units from the one or more manufacturers. This step allows the system 100 to make informed decisions based on real-world performance data across various manufacturers. The processor 104 enables cross-vendor comparisons and helps in selecting the most efficient hardware for specific AI tasks.

At step 310, the method 300 further includes utilizing, by the at least one processor 104, the deep learning model 110 to predict infrastructure requirements for the AI workload. In such implementations, utilizing the deep learning model 110 further includes improving, the at least one processor 104, visibility into current telemetry data, data platform metrics, and resource consumption. In some implementations, the deep learning model 110 is trained on historical resource usage, performance, and cost data. By using the deep learning model 110 trained on historical data, this step enables accurate prediction of infrastructure requirements. The processor 104 improves resource allocation efficiency and helps in proactive capacity planning.

At step 312, the method 300 further includes generating, by the at least one processor 104, the recommendations for the optimal processing unit configuration based on the multi-vendor processing unit performance database 112 and the predicted infrastructure requirements. This step synthesizes the information from the performance database and the deep learning model 110 to provide optimal configuration recommendations. It takes the complexity out of hardware selection and configuration, potentially leading to better performance and cost-efficiency.

At step 314, the method 300 further includes automatically allocating, by the at least one processor 104, the processing unit resources from the one or more manufacturers based on the recommended optimal processing unit configuration. Automation of resource allocation reduces human error, speeds up deployment, and ensures that the optimal configuration is implemented accurately.

At step 316, the method 300 further includes generating, by the at least one processor 104, data for display on the user interface dashboard 200 presenting information about the one or more manufacturers, the determined one or more types of processing units, the recommended optimal processing unit configuration, and real-time performance metrics of the allocated processing unit resources.

In some implementations, the method 300 further includes deciding, by the at least one processor 104, the policy criteria for the AI workload and resource access using an AI policy and resource manager. This step ensures that resource allocation and AI workload management adhere to predefined policies. The processor 104 helps in maintaining security, compliance, and operational standards across different AI workloads and resources.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural. The word "exemplary" is used herein to mean "serving as an example, instance or illustration". Any embodiment described as "exemplary" is not necessarily to be construed as preferred or advantageous over other embodiments and/or to exclude the incorporation of features from other embodiments. The word "optionally" is used herein to mean "is provided in some embodiments and not provided in other embodiments". It is appreciated that certain features of the present disclosure, which are, for clarity, described in the context of separate embodiments, may also be provided in combination in a single embodiment. Conversely, various features of the present disclosure, which are, for brevity, described in the context of a single embodiment, may also be provided separately or in any suitable combination or as suitable in any other described embodiment of the disclosure.

What is claimed is:

1. A system for recommending and optimizing artificial intelligence (AI) workload placement in a multi-vendor cloud environment, the system comprising:
   a server comprising at least one processor configured to:
   access input datasets stored in a datacentre associated with an AI workload;
   determine one or more type of processing units associated with one or more manufacturers for the input datasets based on a set of predefined criteria;
   determine a count of processing units required for processing the input datasets based on the determined one or more types of processing units;
   access a multi-vendor processing unit performance database storing performance data for the determined one or more types of processing units from the one or more manufacturers;
   utilize a deep learning model to predict infrastructure requirements for the AI workload;
   generate recommendations for an optimal processing unit configuration based on the multi-vendor processing unit performance database and the predicted infrastructure requirements;
   automatically allocate processing unit resources from the one or more manufacturers based on the recommended optimal processing unit configuration; and
   generate data for display on a user interface dashboard presenting information about the one or more manufacturers, the determined one or more types of processing units, the recommended optimal processing unit configuration, and real-time performance metrics of allocated processing unit resources.

2. The system of claim 1, wherein the set of predefined criteria comprises at least one of:
   cost, price-performance ratio, or power consumption.

3. The system of claim 1, wherein the deep learning model is trained on historical resource usage, performance, and cost data.

4. The system of claim 1, wherein, in order to utilize the deep learning model to predict the infrastructure requirements, the at least one processor is further configured to improve visibility into current telemetry data, data platform metrics, and resource consumption.

5. The system of claim 1, wherein the at least one processor is further configured to decide policy criteria for the AI workload and resource access using an AI policy and resource manager.

6. The system of claim 1, wherein the one or more type of processing units comprises at least one of: graphics processing units (GPUs), tensor processing units (TPUs), central processing units (CPUs), or intelligence processing units (IPUs).

7. The system of claim 1, wherein the at least one processor is further configured to update the multi-vendor processing unit performance database with performance data from the allocated processing unit resources.

8. The system of claim 1, wherein the deep learning model is configured to dynamically adjust its predictions based on real-time performance metrics of the allocated processing unit resources.

9. The system of claim 1, wherein the at least one processor is further configured to perform load balancing across the allocated processing unit resources from the one or more manufacturers.

10. The system of claim 1, wherein the user interface dashboard provides options for manual override of the recommended optimal processing unit configuration.

11. The system of claim 1, wherein the at least one processor is further configured to generate alerts when the real-time performance metrics deviate from the predicted infrastructure requirements by a predetermined threshold.

12. The system of claim 1, wherein the at least one processor is further configured to optimize resources cost by dynamically reallocating processing unit resources based on real-time pricing information from the one or more manufacturers.

13. The system of claim 1, wherein the at least one processor is further configured to generate a report comparing the predicted infrastructure requirements with actual performance metrics of the allocated processing unit resources.

14. The system of claim 1, wherein the at least one processor is further configured to simulate different processing unit configurations before actual allocation to optimize resource utilization.

15. A method for optimizing artificial intelligence (AI) workload placement in a multi-vendor cloud environment, the method comprising:
   accessing, by at least one processor, input datasets stored in a datacentre associated with an AI workload;
   determining, by the at least one processor, one or more type of processing units associated with one or more manufacturers for the input datasets based on a set of predefined criteria;
   determining, by the at least one processor, a count of processing units required for processing the input datasets based on the determined one or more types of processing units;

accessing, by the at least one processor, a multi-vendor processing unit performance database storing performance data for the determined one or more types of processing units from the one or more manufacturers;

utilizing, by the at least one processor, a deep learning model to predict infrastructure requirements for the AI workload;

generating, by the at least one processor, recommendations for an optimal processing unit configuration based on the multi-vendor processing unit performance database and the predicted infrastructure requirements;

automatically allocating, by the at least one processor, processing unit resources from the one or more manufacturers based on the recommended optimal processing unit configuration; and generating, by the at least one processor, data for display on a user interface dashboard presenting information about the one or more manufacturers, the determined one or more types of processing units, the recommended optimal processing unit configuration, and real-time performance metrics of the allocated processing unit resources.

16. The method of claim 15, wherein the set of predefined criteria comprises at least one of cost, price-performance ratio, or power consumption.

17. The method of claim 15, wherein the deep learning model is trained on historical resource usage, performance, and cost data.

18. The method of claim 15, wherein utilizing the deep learning model further comprises improving, the at least one processor, visibility into current telemetry data, data platform metrics, and resource consumption.

19. The method of claim 15, further comprising deciding, by the at least one processor, policy criteria for the AI workload and resource access using an AI policy and resource manager.

20. The method of claim 15, wherein the one or more type of processing units comprises at least one of: graphics processing units (GPUs), tensor processing units (TPUs), central processing units (CPUs), or intelligence processing units (IPUs).

* * * * *